(12) United States Patent
Lee et al.

(10) Patent No.: US 11,360,301 B2
(45) Date of Patent: Jun. 14, 2022

(54) AUGMENTED REALITY HEAD-UP DISPLAY APPARATUS

(71) Applicants: SAMSUNG ELECTRONICS CO., LTD., Suwon-si (KR); GLOTEC Corp., Chungju-si (KR)

(72) Inventors: Jinho Lee, Suwon-si (KR); Ki Gwon Lee, Chungju-si (KR); Ho Seok Lee, Chungju-si (KR); Yoonsun Choi, Yongin-si (KR); Dong Kyung Nam, Yongin-si (KR); Seong Won Yoo, Chungju-si (KR)

(73) Assignees: SAMSUNG ELECTRONICS CO., LTD., Suwon-si (KR); GLOTEC Corp., Chungju-si (KR)

( * ) Notice: Subject to any disclaimer, the term of this patent is extended or adjusted under 35 U.S.C. 154(b) by 0 days.

(21) Appl. No.: 17/024,985

(22) Filed: Sep. 18, 2020

(65) Prior Publication Data

US 2021/0181505 A1    Jun. 17, 2021

(30) Foreign Application Priority Data

Dec. 12, 2019    (KR) .................. 10-2019-0165780

(51) Int. Cl.
  *G02B 27/01*    (2006.01)
  *G02B 3/00*    (2006.01)
  *G06T 19/00*    (2011.01)
  *B60K 35/00*    (2006.01)

(52) U.S. Cl.
  CPC .......... *G02B 27/0101* (2013.01); *B60K 35/00* (2013.01); *B60K 2370/1529* (2019.05); *G02B 3/0062* (2013.01); *G02B 2027/0123* (2013.01); *G06T 19/006* (2013.01)

(58) Field of Classification Search
  CPC ............ G02B 27/0101; G02B 27/0172; G02B 27/096; G02B 2027/0123; G02B 30/27; G02B 3/0062; B60K 35/00; B60K 2370/1529
  See application file for complete search history.

(56) References Cited

U.S. PATENT DOCUMENTS

| | | | |
|---|---|---|---|
| 7,482,567 B2 | 1/2009 | Hoelen et al. | |
| 2016/0282617 A1 | 9/2016 | Asai | |
| 2017/0146798 A1* | 5/2017 | Nambara | ............... B60K 35/00 |
| 2018/0210201 A1* | 7/2018 | Togasaki | ........... G02F 1/133536 |
| 2020/0228789 A1* | 7/2020 | Larson | ................. H04N 13/351 |
| 2020/0301136 A1* | 9/2020 | Narushima | .......... G02B 3/0043 |

FOREIGN PATENT DOCUMENTS

| | | |
|---|---|---|
| JP | 2007-087792 A | 4/2007 |
| JP | 5353203 B2 | 11/2013 |
| KR | 10-2018-0086225 A | 7/2018 |
| KR | 10-2018-0134080 A | 12/2018 |

\* cited by examiner

*Primary Examiner* — Xuemei Zheng
(74) *Attorney, Agent, or Firm* — Sughrue Mion, PLLC (57) ABSTRACT

An augmented reality head-up display (AR HUD) apparatus is provided. A backlight unit (BLU) for an AR HUD includes a light emitting diode (LED) array including a plurality of LEDs, a primary lens array configured to primarily concentrate light output by the plurality of LEDs, a secondary lens array configured to secondarily concentrate light incident through the primary lens array, and a side reflector configured to reflect light traveling toward a side surface above the secondary lens array among light incident through the secondary lens array.

14 Claims, 5 Drawing Sheets

AUGMENTED REALITY HEAD-UP DISPLAY APPARATUS

CROSS-REFERENCE TO RELATED APPLICATION

This application claims priority from Korean Patent Application No. 10-2019-0165780, filed on Dec. 12, 2019, in the Korean Intellectual Property Office, the disclosure of which is herein incorporated by reference in its entirety.

BACKGROUND

1. Field

One or more example embodiments relate to an augmented reality head-up display (AR HUD) apparatus.

2. Description of the Related Art

A head-up display (HUD) system may generate a virtual image in front of a user (e.g., a driver) and display information in the virtual image, thereby providing the user with a variety of information. When the HUD system is used in a vehicle, the information provided to the driver may include, for example, navigation information and dashboard information such as a vehicle speed, a fuel level, and an engine revolution per minute (RPM). The driver may easily recognize the information displayed in front without turning his or her gaze during driving, and thus driving safety may be improved. In addition to the navigation information and the dashboard information, the HUD system may also provide the driver with, for example, a lane indicator, a construction indicator, an accident indicator, a pedestrian detection indicator using augmented reality (AR), to assist with driving when a view is not clear.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided a backlight unit (BLU) for an augmented reality head-up display (AR HUD), the BLU including a light emitting diode (LED) array including a plurality of LEDs, a primary lens array disposed above the LED array and configured to concentrate light output by the plurality of LEDs, a secondary lens array disposed above the primary lens array and configured to concentrate light incident through the primary lens array, and a side reflector disposed on a side surface above the secondary lens array and configured to reflect light traveling toward the side surface among light incident through the secondary lens array.

A light emitting angle of each of lenses included in the secondary lens array may be equal to or less than a field of view (FOV) of the BLU. A curvature of each of lenses included in the secondary lens array may be less than a curvature of each of lenses included in the primary lens array. The secondary lens array may include an aspheric lens. Lenses include in the secondary lens array are configured such that rays corresponding to light passing through the secondary lens array may not be parallel to each other.

The primary lens array may correspond to a cap lens, and the secondary lens array may correspond to a fly-eye lens.

The BLU may further include a diffuser disposed between the secondary lens array and the side reflector and configured to diffuse the light incident through the secondary lens array. The BLU may further include a polarizing diffuser plate disposed above the side reflector. A number of the plurality of LEDs included in the LED array, a number of a plurality of lenses included in the primary lens array and a number of a plurality of lenses included in the secondary lens array may be the same.

According to an aspect of an example embodiment, there is provided an AR HUD apparatus, the AR HUD apparatus including an LED array including a plurality of LEDs, a primary lens array disposed above the LED array and configured to concentrate light output by the plurality of LEDs, a secondary lens array disposed above the primary lens array and configured to concentrate light incident through the primary lens array, a diffuser disposed above the secondary lens array and configured to diffuse the light incident through the secondary lens array, a side reflector disposed on a side surface above the diffuser and configured to reflect light traveling toward the side surface among light incident through the diffuser, a polarizing diffuser plate disposed above the side reflector, a display panel disposed above the polarizing diffuser plate, and a housing configured to support the LED array, the primary lens array, the secondary lens array, the diffuser, the side reflector, the polarizing diffuser plate and the display panel.

BRIEF DESCRIPTION OF THE DRAWINGS

The above and/or other aspects will be more apparent by describing certain example embodiments with reference to the accompanying drawings, in which.

DETAILED DESCRIPTION

The following structural or functional descriptions are examples to merely describe the example embodiments, and the scope of the example embodiments are not limited to the descriptions provided in the specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, example embodiments will be described in detail with reference to the accompanying drawings, wherein like reference numerals refer to the like elements throughout.

Figure 1:
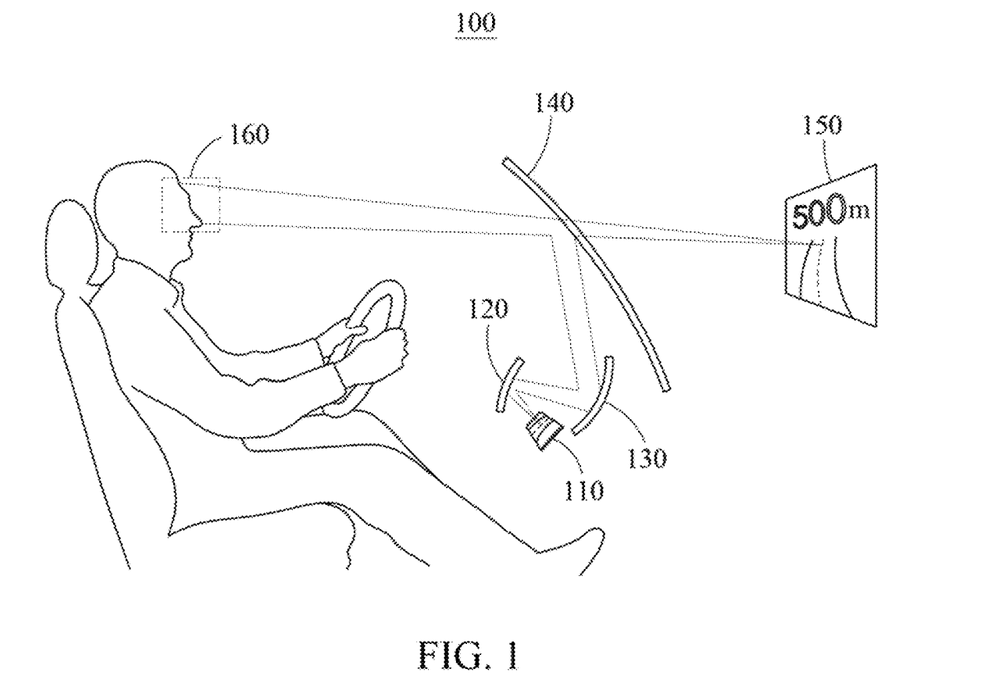
FIG. 1 is a diagram illustrating components of an augmented reality head-up display (AR HUD) system according to an example embodiment.

FIG. 1 is a diagram illustrating components of an augmented reality head-up display (AR HUD) system according to an example embodiment. Referring to FIG. 1, a HUD system 100 includes a display device 110 and mirrors 120 and 130. For illustrative purposes, it is described that the HUD system 100 is used in a vehicle to display a virtual image to a driver. However, the disclosure is not limited thereto.

The display device 110 may include a display panel and a backlight unit (BLU). The display panel may display a HUD image, and the BLU may provide light for the HUD image to the display panel.

Light corresponding to the HUD image displayed by the display device 110 may be reflected by the mirrors 120 and 130 and projected on a windshield 140. At least one of the mirrors 120 and 130 may correspond to an aspheric surface mirror. A driver may view a virtual image of the HUD image on a virtual image plane 150 through light reflected to an eye box 160 by the windshield 140.

The HUD system 100 may display information on the virtual image plane 150 in front of the driver by a projection method. To provide information of an AR level using a HUD, the virtual image plane 150 on which the HUD image is viewed may need to be implemented with a wide field of view (FOV). When a representation image (or an HUD image) is not sufficiently large in size or when a FOV is not sufficiently wide, it may be difficult to represent information about a background or an object in front of a vehicle using AR.

The display device 110 and the mirrors 120 and 130 may be mounted in a dashboard of a vehicle. However, since a space of the dashboard is limited, there may be limitations in implementing a sufficiently wide FOV by increasing a size of each of the display device 110 and the mirrors 120 and 130.

For example, when a light emitting diode (LED) array is used as a light source, and when optical lenses are compactly arranged, a volume, in particular, a height, of the BLU may be efficiently reduced. However, in this example, a quality of the HUD image may be degraded, for example, a boundary surface between lenses may be visible. Also, to increase the size of the representation image, an amount of light may need to increase, and thus a power consumption may increase. The amount of light may be related to a FOV of the BLU and a diffusion angle of a diffuser.

The FOV of the BLU may be designed based on a FOV of a HUD. Since a narrower FOV than that of a general display, for example, a television (TV) or a monitor, is required by the HUD, the HUD generally collects light of the BLU maximally to a front surface based on a parallel lens design to enhance a light efficiency. Since an AR HUD requires a wider FOV than that of a general HUD, the screen is highly likely to be darkened or the lens shape is highly likely to be visible when the driver see the virtual image in the screen at the moved positions corresponding to an outer edge of the eye box 160 if the AR HUD is designed with parallel lenses.

A BLU according to example embodiments may optimize a light emitting angle of light output by an LED using a secondary lens array, and may compensate for insufficiency of the light emitting angle using a side reflector. In this example, a diffusion angle of each of a diffuser plate and a polarizing diffuser plate is maintained at a relatively small value, and accordingly it is possible to prevent an efficiency of the BLU from being reduced. Thus, it is possible to achieve a compact volume of the BLU, a wide FOV, a light uniformity, and an enhanced side brightness of the virtual image from BLU.

Figure 2:
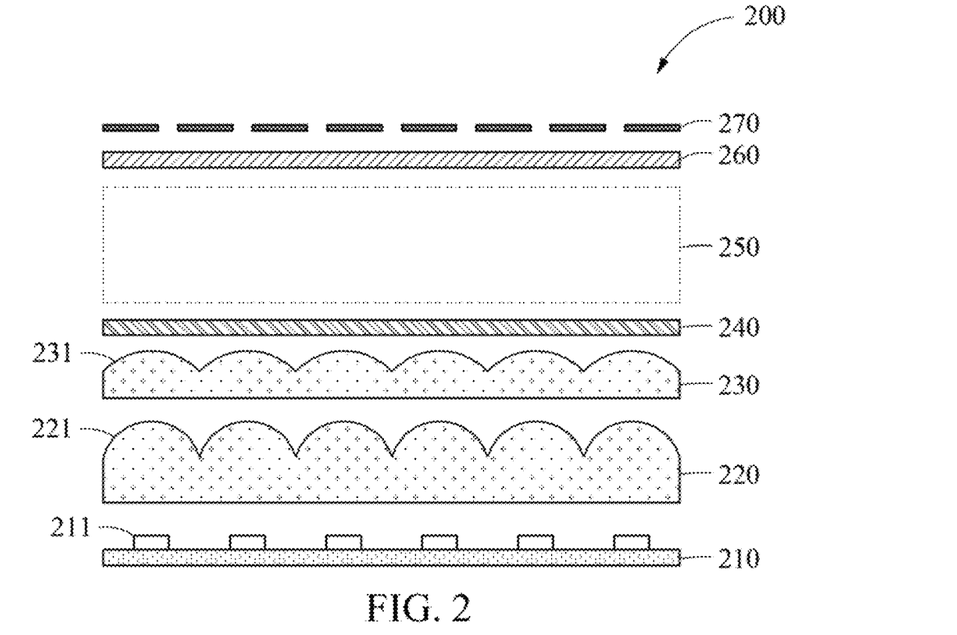
FIG. 2 is a cross-sectional view illustrating a structure of a backlight unit (BLU) according to an example embodiment.

FIG. 2 is a cross-sectional view illustrating a structure of a BLU according to an example embodiment. Referring to FIG. 2, a BLU 200 includes an LED array 210, a primary lens array 220, a secondary lens array 230, a diffuser 240, a side reflector 250 and a polarizing diffuser plate 260. A display panel may be disposed on a region 270 above the polarizing diffuser plate 260.

The LED array 210 may include a plurality of LEDs. For example, the plurality of LEDs may be arranged in a form of an M×N matrix. The LED array 210 may greatly contribute to reducing a size of the BLU 200. An LED 211 may be one of the plurality of LEDs. Each of the plurality of LEDs may output light, and light output by each of the LEDs may be provided to the primary lens array 220.

The primary lens array 220 may be disposed above the LED array 210 and may include a plurality of lenses. A lens 221 may be one of the plurality of lenses included in the primary lens array 220 and may be hereinafter referred to as a "primary lens". The primary lens array 220 may primarily concentrate light output by the plurality of LEDs in the LED array 210. For example, the primary lens array 220 may correspond to a cap lens.

The secondary lens array 230 may be disposed above the primary lens array 220 and may include a plurality of lenses. The primary lens array 220 and the secondary lens array 230 may be disposed without a gap therebetween. A lens 231 may be one of the plurality of lenses included in the secondary lens array 230 and may be hereinafter referred to as a "secondary lens". The secondary lens array 230 may secondarily concentrate light incident through the primary lens array 220. For example, the secondary lens array 230 may correspond to a fly eye lens. A curvature of the secondary lens 231 may be less than a curvature of the primary lens 221, and a thickness of the primary lens 221 may be greater than a thickness of the secondary lens 231. A predetermined light emitting angle may be assigned to a path of light through a secondary light concentration. In an example, considering that a luminance may decrease when a light emitting angle of the secondary lens 231 increases, it may be designed that the light emitting angle of the secondary lens 231 may be limited based on the FOV of the BLU 200. For example, a light emitting surface or the curvature of the secondary lens 231 may be designed such that the light emitting angle of the secondary lens 231 based on a chief ray of the LED 211 may be less than or equal to the FOV of the BLU 200. The secondary lens 231 may correspond to a non-parallel lens, and rays corresponding to light passing through the secondary lens array 230 may not be parallel to each other. For example, the secondary lens 231 may correspond to an aspheric lens.

The diffuser 240 may be disposed above the secondary lens array 230, and may diffuse light incident through the secondary lens array 230. By the diffuser 240, a visibility of a boundary surface between lenses may be reduced.

The side reflector 250 may be disposed on a side surface above the diffuser 240, and may reflect light traveling toward the side surface of the diffuser 240 among the light incident through the secondary lens array 230. For example, the side reflector 250 may be disposed in a direction toward a side of the diffuser 240 and is above a side surface of the diffuser 240.

In an example embodiment, the diffuser 240 may be omitted, and in such a case, the side reflector 250 may be disposed on a side surface above the secondary lens array 230 and may reflect light traveling toward the side surface of the secondary lens array 230 among the light incident through the secondary lens array 230. For example, the side reflector 250 may correspond to a high reflection coating and may contribute to a brightness and a uniformity for observation at out of center position in the eye box 160. For example, when the light emitting angle of the secondary lens 231 is limited, a shortage of light may occur in an outer region of the FOV of the BLU 200 and the shortage of light may be compensated for by the side reflector 250. Thus, a desired FOV and radiation angle of the BLU 200 may be secured.

The polarizing diffuser plate 260 may be disposed above the side reflector 250. The polarizing diffuser plate 260 may be spaced apart by a predetermined distance from the diffuser 240. The polarizing diffuser plate 260 may increase a light efficiency of the BLU 200 by recycling polarized light. For example, the polarizing diffuser plate 260 may correspond to a polarization reflection prism plate or a dual brightness enhancement film (DBEF).

Figure 3:
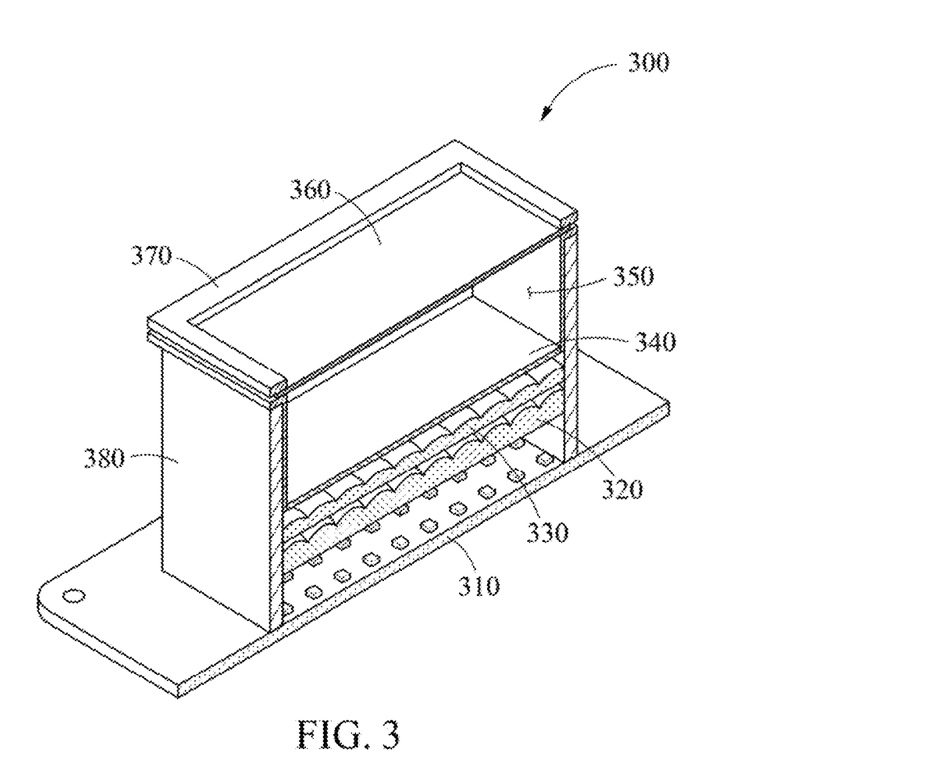
FIG. 3 is a perspective view illustrating a structure of a BLU according to an example embodiment.

FIG. 3 is a perspective view illustrating a structure of a BLU according to an example embodiment. Referring to FIG. 3, a BLU 300 includes an LED array 310, a primary lens array 320, a secondary lens array 330, a diffuser 340, a side reflector 350, a polarizing diffuser plate 360, a top cover 370 and a housing 380.

The primary lens array 320 and the secondary lens array 330 may be disposed above the LED array 310, and the diffuser 340 may be disposed above the secondary lens array 330. The side reflector 350 may be disposed on a side surface above the diffuser 340. The side reflector 350 may be applied to all side regions above the diffuser 340. For example, a structure of the BLU 300 of FIG. 3 has four side regions above the diffuser 340, and the side reflector 350 may correspond to a high reflection coating applied to the four side regions. In other words, in a space between the side reflector 350 and the polarizing diffuser plate 360, and the side reflector 350 may be applied to an inner side surface of the space between the side reflector 350 and the polarizing diffuser plate 360.

A display panel may be disposed above the polarizing diffuser plate 360, and the top cover 370 may fix the display panel to the BLU 300. The housing 380 may support components of the BLU 300, for example, the LED array 310, the primary lens array 320, the secondary lens array 330, the diffuser 340, the side reflector 350, the polarizing diffuser plate 360 and the top cover 370.

Figure 4:
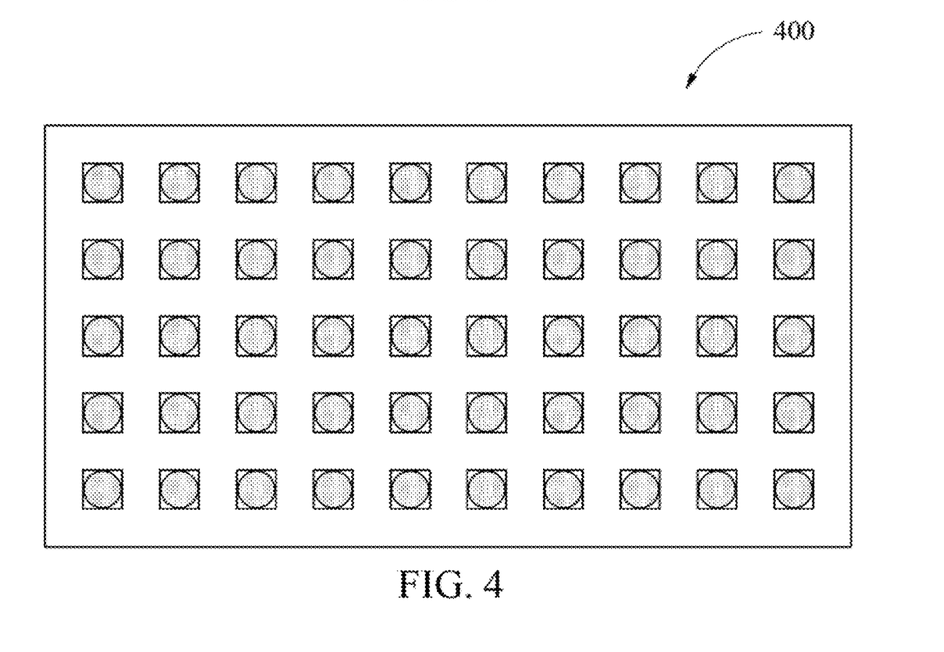
FIG. 4 is a plane view illustrating a structure of a light emitting diode (LED) array according to an example embodiment.

FIG. 4 is a plane view illustrating a structure of an LED array according to an example embodiment. An LED array 400 may include a plurality of LEDs arranged in a form of an M×N matrix. Referring to FIG. 4, the plurality of LEDs may be arranged on a metal printed circuit board (PCB).

Figure 5:
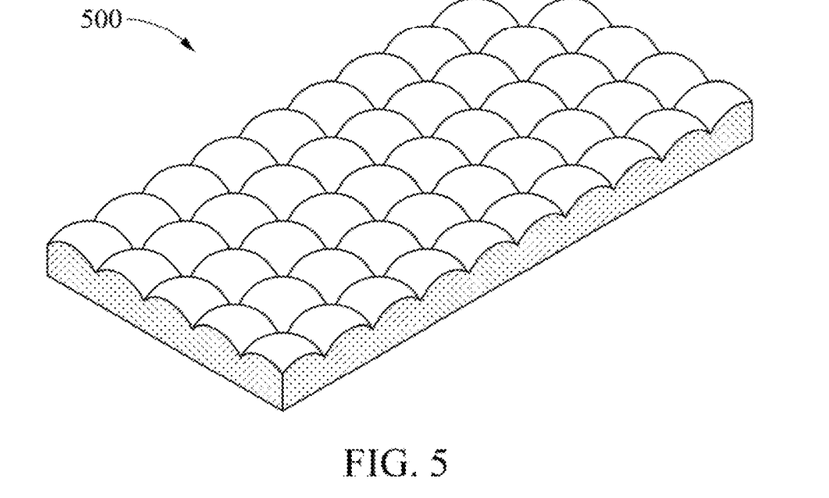
FIG. 5 illustrates a structure of a primary lens array according to an example embodiment.
Figure 6:
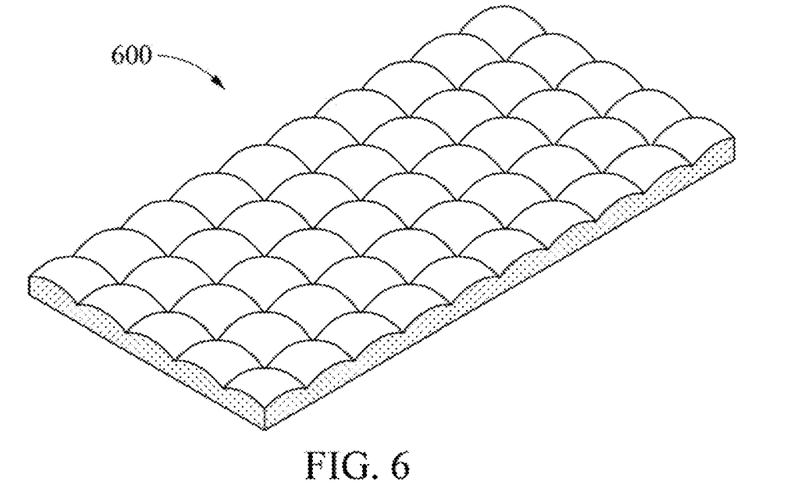
FIG. 6 illustrates a structure of a secondary lens array according to an example embodiment.

FIG. 5 illustrates a structure of a primary lens array according to an example embodiment, and FIG. 6 illustrates a structure of a secondary lens array according to an example embodiment. Referring to FIGS. 5 and 6, a curvature of each of secondary lenses included in a secondary lens array 600 may be less than a curvature of each of primary lenses included in a primary lens array 500. Also, a thickness of the primary lens array 500 may be greater than a thickness of the secondary lens array 600. In addition, a number of primary lenses included in the primary lens array 500 and a number of secondary lenses included in the secondary lens array 600 may be "M×N", respectively. In other words, the number of primary lenses included in the primary lens array 500 and the number of secondary lenses included in the secondary lens array 600 may be respectively the same as a number of a plurality of LEDs included in each LED array.

Figure 7:
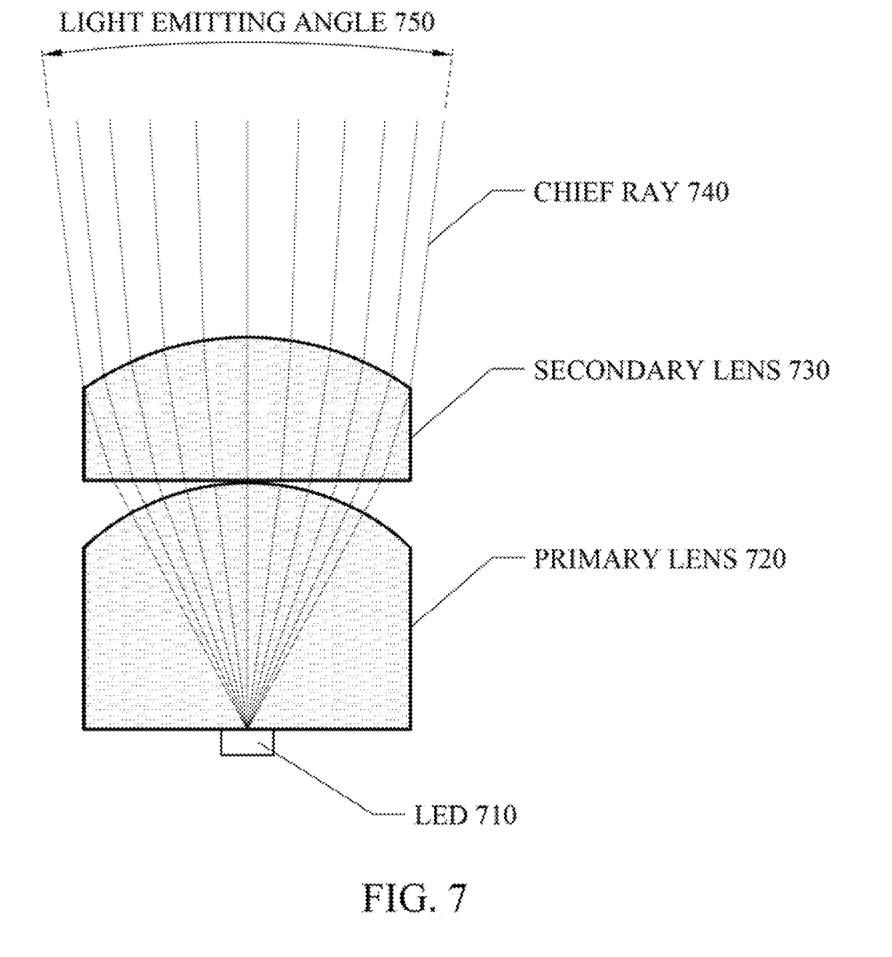
FIG. 7 is a diagram illustrating a light emitting angle based on chief rays according to an example embodiment.

FIG. 7 is a diagram illustrating a light emitting angle based on chief rays according to an example embodiment. Referring to FIG. 7, light output from an LED 710 may pass through a primary lens 720 and a secondary lens 730.

An upper surface and a lower surface of each of the primary lens 720 and the secondary lens 730 may correspond to a curved surface and a plane, respectively. The primary lens 720 and the secondary lens 730 may be disposed without a gap therebetween. In other words, a primary lens array and a secondary lens array may be disposed such that a gap may not be formed between the upper surface of the primary lens 720 and the bottom surface of the secondary lens 730. The primary lens 720 may perform a function of spreading light output from the LED 710, and the secondary lens 730 may perform a function of assigning a predetermined angle to light passing through the primary lens 720.

Rays shown in FIG. 7 may correspond to chief rays of the light output from the LED 710. Based on the chief ray, a light emitting angle 750 of the secondary lens 730 may be measured. For example, outermost chief rays may be selected among the chief rays, and the light emitting angle 750 may be measured based on a portion of the secondary lens 730 through which the selected chief rays pass.

The light emitting angle 750 may be equal to or less than a FOV of a BLU. For example, when the FOV of the BLU is designed based on a FOV of a HUD, a light emitting surface or a curvature of the secondary lens 730 may be designed to have the light emitting angle 750.

Figure 8:
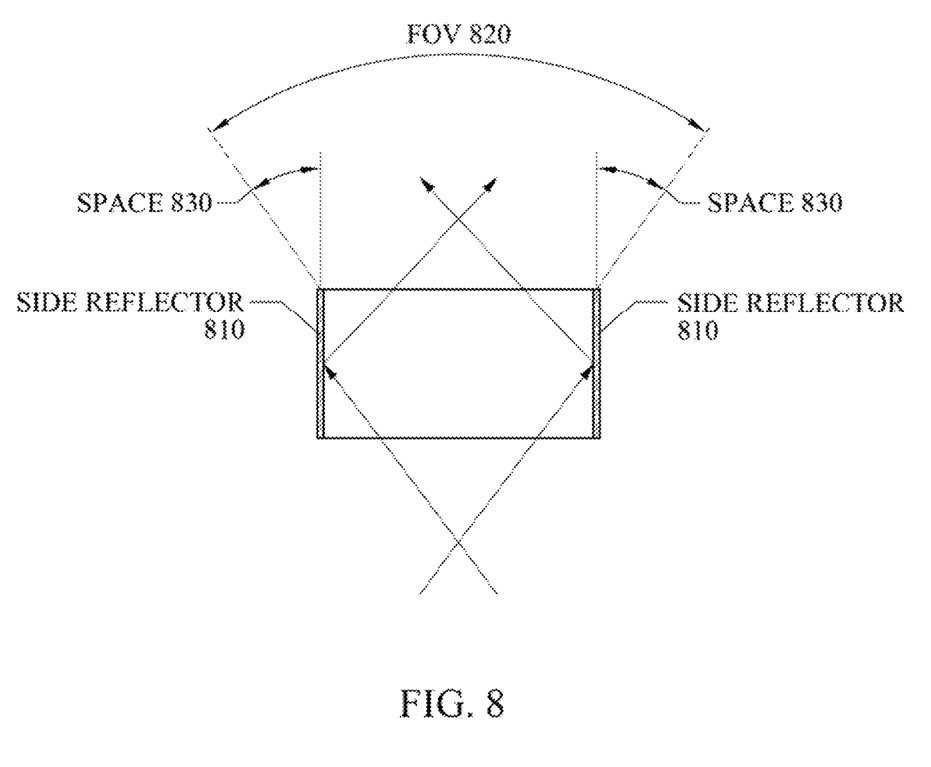
FIG. 8 is a diagram illustrating an expansion of a field of view (FOV) by a side reflector according to an example embodiment.

FIG. 8 is a diagram illustrating an expansion of a FOV by a side reflector according to an example embodiment. Referring to FIG. 8, light output from an LED may pass through a primary lens and a secondary lens, and at least a portion of the light may arrive at a side reflector 810. Light arriving at the side reflector 810 may be reflected by the side reflector 810 and provided to a display panel.

As described above, a light emitting angle of the secondary lens may be limited by a FOV 820 of a BLU. When the side reflector 810 is absent, most of light traveling toward the side reflector 810 may be absorbed and sufficient light may not be supplied to a space 830. When the side reflector 810 is present, sufficient light may be supplied to the space 830 to achieve the FOV 820 of the BLU. Also, when the side reflector 810 is present, a diffusion angle of each of a diffuser plate and a polarizing diffuser plate may be minimized, thereby preventing an efficiency of the BLU from decreasing.

Thus, it is possible to achieve a compact volume of the BLU, a maximization of efficiency of the BLU, a wide FOV, a uniformity and an enhanced side brightness, by applying the side reflector 810 and by limiting the light emitting angle of the secondary lens and the diffusion angle of each of the diffuser plate and the polarizing diffuser plate.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art would understand that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A backlight unit (BLU) for an augmented reality head-up display (AR HUD), the BLU comprising:
   a light emitting diode (LED) array comprising a plurality of LEDs;
   a primary lens array disposed above the LED array and configured to concentrate light output by the plurality of LEDs;
   a secondary lens array disposed above the primary lens array and configured to concentrate light incident through the primary lens array;
   a side reflector disposed on a side surface above the secondary lens array and configured to reflect light traveling toward the side surface among light incident through the secondary lens array; and
   a polarizing diffuser plate disposed above the side reflector.

2. The BLU of claim 1, wherein a light emitting angle of each of lenses included in the secondary lens array is equal to or less than a field of view (FOV) of the BLU.

3. The BLU of claim 1, wherein a curvature of each of lenses included in the secondary lens array is less than a curvature of each of lenses included in the primary lens array.

4. The BLU of claim 1, wherein the secondary lens array includes an aspheric lens.

5. The BLU of claim 1, wherein lenses include in the secondary lens array are configured such that rays corresponding to light passing through the secondary lens array are not parallel to each other.

6. The BLU of claim 1, wherein
   the primary lens array corresponds to a cap lens, and
   the secondary lens array corresponds to a fly-eye lens.

7. The BLU of claim 1, further comprising:
   a diffuser disposed between the secondary lens array and the side reflector and configured to diffuse the light incident through the secondary lens array.

8. The BLU of claim 1, wherein a number of the plurality of LEDs included in the LED array, a number of a plurality of lenses included in the primary lens array, and a number of a plurality of lenses included in the secondary lens array are the same.

9. An augmented reality head-up display (AR HUD) apparatus, the AR HUD apparatus comprising:

a light emitting diode (LED) array comprising a plurality of LEDs;

a primary lens array disposed above the LED array and configured to concentrate light output by the plurality of LEDs;

a secondary lens array disposed above the primary lens array and configured to concentrate light incident through the primary lens array;

a diffuser disposed above the secondary lens array and configured to diffuse the light incident through the secondary lens array;

a side reflector disposed on a side surface above the diffuser and configured to reflect light traveling toward the side surface among light incident through the diffuser;

a polarizing diffuser plate disposed above the side reflector;

a display panel disposed above the polarizing diffuser plate; and a housing configured to support the LED array, the primary lens array, the secondary lens array, the diffuser, the side reflector, the polarizing diffuser plate and the display panel.

10. The AR HUD apparatus of claim 9, wherein a light emitting angle of each of lenses included in the secondary lens array is equal to or less than a field of view (FOV) of a backlight unit (BLU).

11. The AR HUD apparatus of claim 9, wherein each of lenses included in the secondary lens array corresponds to an aspheric lens.

12. The AR HUD apparatus of claim 9, wherein lenses include in the secondary lens array are configured such that rays corresponding to light passing through the secondary lens array are not parallel to each other.

13. The AR HUD apparatus of claim 9, wherein the primary lens array corresponds to a cap lens, and the secondary lens array corresponds to a fly-eye lens.

14. A backlight unit (BLU) for an augmented reality head-up display (AR HUD), the BLU comprising:

a light emitting diode (LED) array comprising a plurality of LEDs;

a primary lens array disposed above the LED array and configured to concentrate light output by the plurality of LEDs;

a secondary lens array disposed above the primary lens array and configured to concentrate light incident through the primary lens array;

a side reflector disposed on a side surface above the secondary lens array and configured to reflect light traveling toward the side surface among light incident through the secondary lens array; and a housing configured to support the LED array, the primary lens array, the secondary lens array, and the side reflector, wherein the side reflector is applied to at least two inner surfaces facing each other among inner surfaces of the housing.

* * * * *